(12) United States Patent
Shimane

(10) Patent No.: US 9,309,991 B2
(45) Date of Patent: Apr. 12, 2016

(54) VALVE DEVICE AND MANUFACTURING METHOD FOR THE SAME

(71) Applicant: DENSO CORPORATION, Kariya, Aichi-pref. (JP)

(72) Inventor: Osamu Shimane, Kariya (JP)

(73) Assignee: DENSO CORPORATION, Kariya (JP)

( * ) Notice: Subject to any disclaimer, the term of this patent is extended or adjusted under 35 U.S.C. 154(b) by 221 days.

(21) Appl. No.: 14/015,109

(22) Filed: Aug. 30, 2013

(65) Prior Publication Data

US 2014/0116526 A1    May 1, 2014

(30) Foreign Application Priority Data

Oct. 26, 2012 (JP) ................. 2012-236936

(51) Int. Cl.

| | | |
|---|---|---|
| *F16K 37/00* | (2006.01) | |
| *F02D 41/30* | (2006.01) | |
| *F02M 25/07* | (2006.01) | |
| *F16B 19/00* | (2006.01) | |
| *G05D 7/06* | (2006.01) | |
| *F02D 41/24* | (2006.01) | |
| *F02D 41/00* | (2006.01) | |

(52) U.S. Cl.
CPC ........ *F16K 37/0083* (2013.01); *F02D 41/2435* (2013.01); *F16B 19/002* (2013.01); *F16K 37/0075* (2013.01); *G05D 7/0635* (2013.01); *F02D 41/0077* (2013.01); *F02D 2200/0616* (2013.01); *Y10T 137/0402* (2015.04); *Y10T 137/7759* (2015.04); *Y10T 137/8242* (2015.04)

(58) Field of Classification Search
CPC .............. Y10T 37/8242; F15B 19/002; F16K 37/0083; F02D 2200/0616
See application file for complete search history.

(56) References Cited

U.S. PATENT DOCUMENTS

| | | | | |
|---|---|---|---|---|
| 4,679,767 A | * | 7/1987 | Vollmer et al. | ........... 251/129.15 |
| 5,150,690 A | * | 9/1992 | Carter | ..................... F02B 43/00 |
| | | | | 123/478 |
| 2009/0277519 A1 | * | 11/2009 | Parker et al. | ............. 137/625.65 |

FOREIGN PATENT DOCUMENTS

| | | | |
|---|---|---|---|
| JP | 2009-002325 A | 1/2009 | |
| JP | 2014-070525 A | 4/2014 | |

OTHER PUBLICATIONS

Office Action issued Aug. 19, 2014 in corresponding JP Application No. 2012-236936 (with English translation).

* cited by examiner

*Primary Examiner* — Atif Chaudry

(57) ABSTRACT

A control unit generates a control signal for controlling an actuator to manipulate a valve element and to control a quantity of flow in a passage according to both an opening position of the valve element and a predetermined correlation between the opening position and the quantity of flow. The control unit includes a storage unit storing an error-characteristic function and a compensation unit to compensate the control signal according to the error-characteristic function. An actual correlation between the opening position and the quantity of flow is actually measured separately from the predetermined correlation. The error-characteristic function is an approximation of a relation between an opening position x in the predetermined correlation and an opening position y in the actual correlation at a same quantity of flow, which are calculated beforehand with reference to the actual correlation and the predetermined correlation.

4 Claims, 3 Drawing Sheets

VALVE DEVICE AND MANUFACTURING METHOD FOR THE SAME

CROSS REFERENCE TO RELATED APPLICATION

This application is based on reference Japanese Patent Application No. 2012-236936 filed on Oct. 26, 2012, the disclosure of which is incorporated herein by reference.

TECHNICAL FIELD

The present disclosure relates to a valve device configured to cause a valve element to open and close a passage thereby to control a quantity of flow correspondingly to an opening position of the valve element.

BACKGROUND

For example, a Patent Document 1 discloses an EGR gas control valve (EGRV) as a conventional valve device employed in an EGR system. The EGR system is configured to recirculate a part of exhaust gas from a combustion chamber of an internal combustion engine into an intake air passage. The EGRV controls a quantity of flow of exhaust gas to be recirculated.

The EGRV includes a valve element to control a quantity of flow correspondingly to its opening position. The EGRV further includes a sensor to detect the opening position of the valve element and an actuator to implement a feedback control to manipulate the valve element according to an output signal from the sensor thereby to control a quantity of flow.

[Patent Document 1] Publication of Unexamined Japanese Patent Application No. 2009-2325

It is noted that, a valve device has its own flow characteristic, which is a relation between the opening position of the valve element and the quantity of flow. The flow characteristic have a variation among individual valve devices due to a variation in shapes of components, a variation in assembly of components, a variation in characteristics of sensors, and/or the like. That is, each individual valve device has an error relative to a reference flow characteristic. Therefore, when an open-control method is employed to control a quantity of flow in each valve device with reference to a single predetermined flow characteristic, the quantity of flow may largely vary among individual valve devices. Consequently, accuracy of flow control may become insufficient to increase emission of exhaust gas and/or to decrease fuel efficiency.

It is further noted that, even in a configuration where a feedback control is implemented in the flow control according to an output signal sent from a flow sensor, open control may be still implemented temporarily. Therefore, accuracy of the flow control at the time of the open control is still desired.

SUMMARY

It is an object of the present disclosure to produce a valve device configured to implement a flow control with high accuracy by reflecting a variation in a flow characteristic of an individual valve device.

According to an aspect of the present disclosure, a valve device comprises a valve element configured to open and close a passage to variably control a quantity of flow of fluid through the passage. The valve device further comprises an actuator configured to manipulate the valve element. The valve device further a sensor configured to detect an opening position of the valve element. The valve device further a control unit configured to generate a control signal for controlling the actuator according to both an output of the sensor and a predetermined correlation between the opening position and the quantity of flow. The control unit is further configured to send the control signal. The control unit includes a storage unit configured to store an error-characteristic function. The control unit further includes a compensation unit configured to compensate the control signal according to the error-characteristic function. The predetermined correlation between the opening position and the quantity of flow is a reference flow characteristic. An actual correlation between the opening position and the quantity of flow is an actual flow characteristic. The actual correlation is actually measured separately from the reference flow characteristic. The error-characteristic function is an approximation of a relation between an opening position x in the reference flow characteristic and an opening position y in the actual flow characteristic at a same quantity of flow, calculated beforehand with reference to the actual flow characteristic and the reference flow characteristic.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Embodiment

Figure 1:
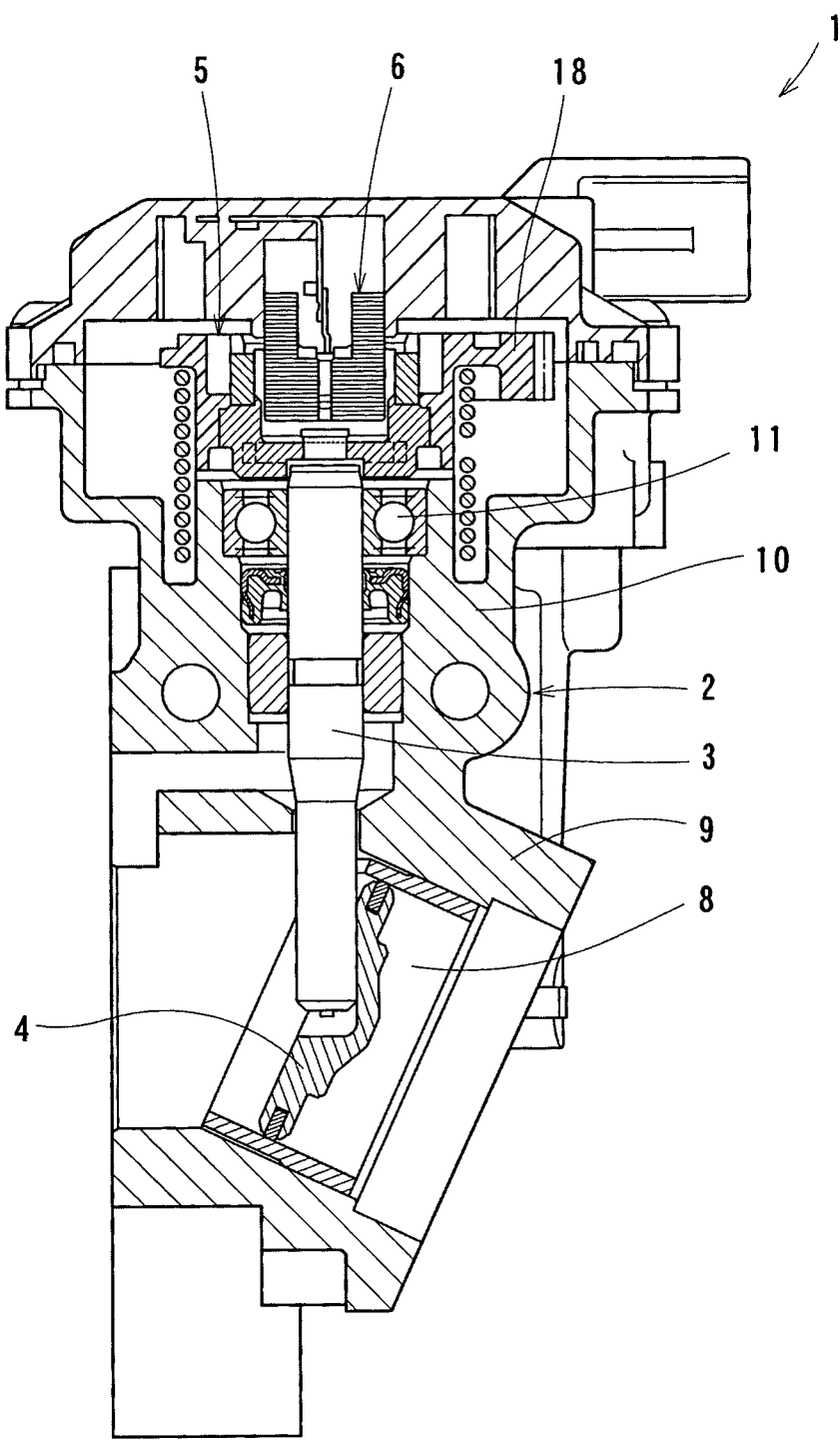
FIG. 1 is a sectional view showing an EGRV according to an embodiment.

An embodiment of the present disclosure will be described with reference to FIGS. 1 to 4. In the present embodiment, an EGRV 1 will be described as an example of the present disclosure.

The EGRV 1 includes a housing 2, a shaft 3, a valve element 4, an actuator 5, an opening position sensor 6, and a control unit. The housing 2 forms a part of a return passage, which refluxes exhaust gas to an intake air passage of an internal combustion engine. The shaft 3 is rotatably accommodated in the housing 2. The valve element 4 is in a disc shape and is fixed to and supported by the shaft 3. The actuator 5 manipulates the valve element 4 via the shaft 3. The opening position sensor 6 detects an opening position of the valve element 4. The control unit generates and sends a control signal to the actuator 5

Figure 2:
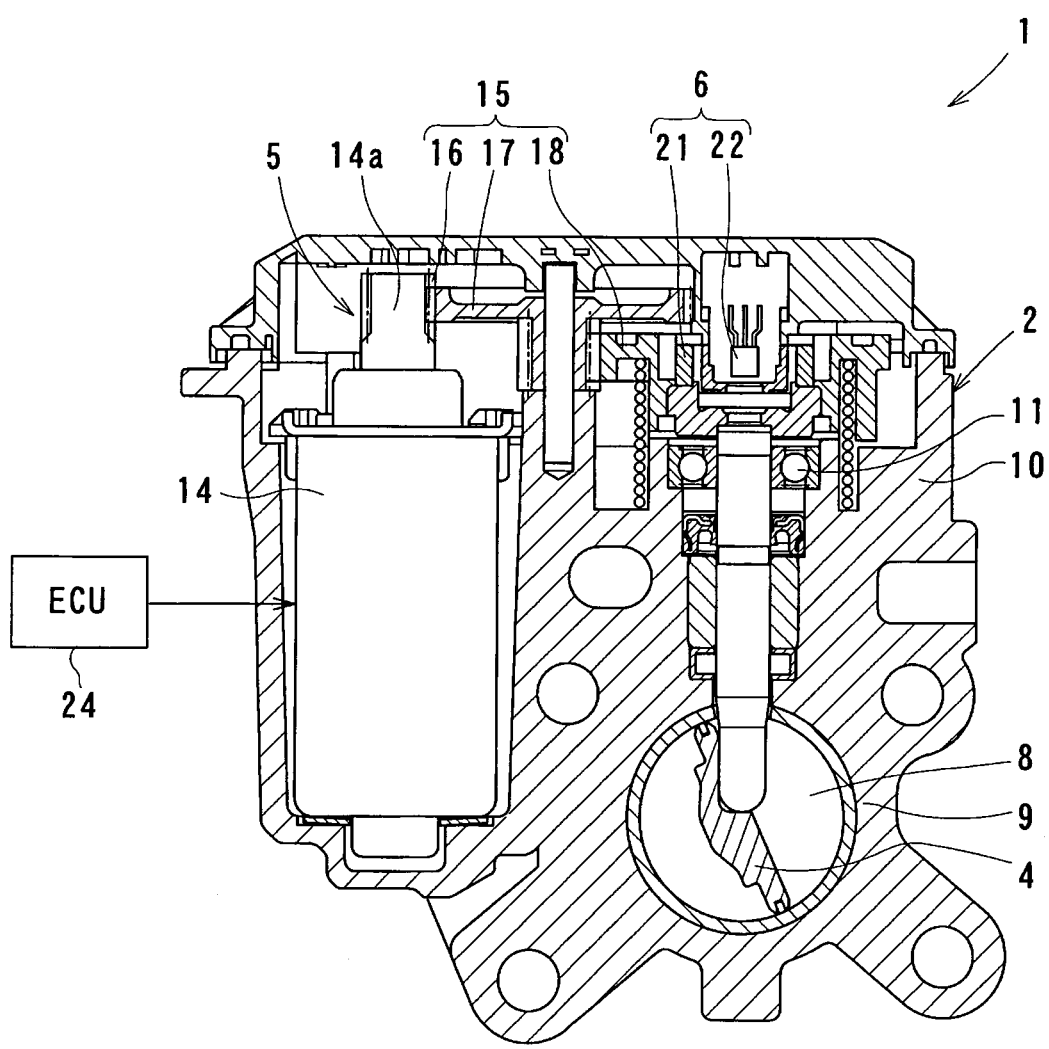
FIG. 2 is a sectional view showing the EGRV according to the embodiment.

The housing 2 includes a passage forming portion 9 and a main body portion 10. The passage forming portion 9 forms a passage 8 as a part of the return passage. The main body portion 10 accommodates the shaft 3 and the actuator 5. The passage forming portion 9 forms the passage 8 having a circular cross section. The main body portion 10 rotatably supports the shaft 3 via the bearing 11, such that an end of the shaft 3 projects into the passage 8. FIG. 1 is a sectional view taken along a flow direction in the passage 8. FIG. 2 is a sectional view taken perpendicularly to the flow direction in the passage 8.

The valve element 4 is formed in the disc shape and is fixed to the end of the shaft 3. In the present configuration, the shaft 3 is rotatable to cause the valve element 4 to open and close the passage. A quantity of flow is controllable correspondingly to the opening position of the valve element 4.

The actuator 5 includes an electric motor 14 and an output power transmission mechanism 15. The electric motor 14 generates a driving force on reception of electricity. The output power transmission mechanism 15 transmits a rotary motion of an output axis 14a of the electric motor 14 to the shaft 3.

The output power transmission mechanism 15 is a gear deceleration mechanism configured to reduce a rotation speed of the output axis 14a at a predetermined reduction ratio. The output power transmission mechanism 15 includes a pinion gear 16, an intermediate reduction gear 17, and a final reduction gear 18. The pinion gear 16 is fixed to an outer circumferential periphery of the output axis 14a. The intermediate reduction gear 17 meshes with the pinion gear 16 to be rotated by the pinion gear 16. The final reduction gear 18 meshes with this the intermediate reduction gear 17 to be rotated by the intermediate reduction gear 17.

The opening position sensor 6 is a noncontact-type rotation angle sensing device including a pair of magnets 21 and a hall IC 22. The magnets 21 are equipped to the final reduction gear 18. The hall IC 22 is located close to the magnets 21. The opening position sensor 6 detects the opening position of the valve element 4 by utilizing an output-change characteristic of the hole IC 22 relative to rotation of the magnet 21. Another noncontact-type magnetism detection element, such as a single body of a hall element or a magnetoresistive element, may be employed instead of the hall IC 22.

In the present example, the control unit is an ECU 24 configured to control a quantity of electricity supplied to the electric motor 14. The ECU 24 includes a microcomputer having a generally-known configuration including functions of a CPU, a storage device, an input circuit (input unit), an output circuit (output unit), and/or the like. The CPU implements a control processing and a data processing. The storage device is a memory device, such as a ROM and a RAM, configured to store various programs and various data. The control unit sends a control signal to the electric motor 14 to implement an opening position control thereby to produce a desired quantity of flow. The control unit implements the opening position control according to an output signal from the opening position sensor 6 and a predetermined correlation between the opening position and the quantity of flow. The correlation is stored beforehand. More specifically, the control unit receives the output signal from the opening position sensor 6. The control unit further produces the control signal, such as a power supply quantity, to be sent to the electric motor, such that the valve opening position, which is detected by the opening position sensor 6, substantially coincides with an opening position target value, which is required to produce a desired quantity of flow.

Feature

Herein, a reference flow characteristic is defined as a correlation between the opening position and the quantity of flow, which is predetermined. In addition, an actual flow characteristic is defined as a correlation between the opening position and the quantity of flow, which is actually measured separately from the reference flow characteristic.

Figure 3:
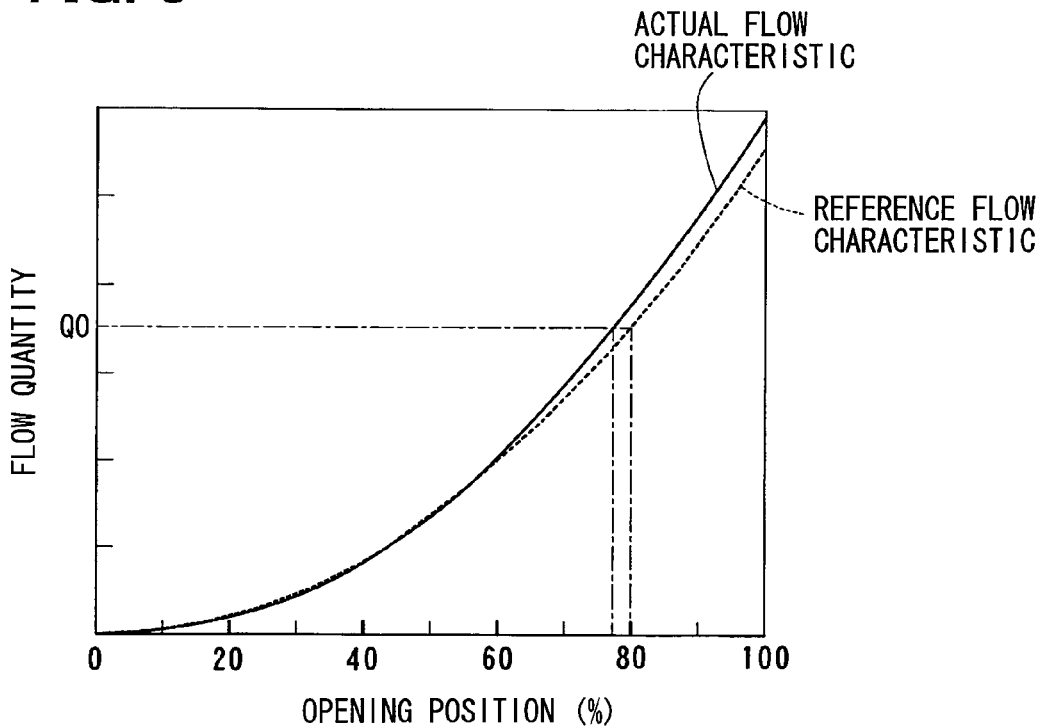
FIG. 3 is a graph showing a flow characteristic according to the embodiment.

FIG. 3 shows both the reference flow characteristic and the actual flow characteristic. The reference flow characteristic is a flow characteristic in an ideal state. The actual flow characteristic contains a variation in characteristic of the opening position sensor 6, a variation in shape of each component, and variation caused by assembly of components. The actual flow characteristic is obtained by actual measurement of a relation between the quantity of flow and the opening position detected by the opening position sensor 6 for each individual EGRV 1. Therefore, an error occurs in the quantity of flow between the reference flow characteristic and the actual flow characteristic at the corresponding valve opening position. Namely, in a case where the opening position is controlled with reference to the reference flow characteristic for each EGRV 1, an error occurs in the quantity of flow produced at the corresponding opening position. That is, an error occurs between the opening position (reference opening position x) in the reference flow characteristic and the opening position (actual opening position y) in the actual flow characteristic at the same quantity of flow.

Figure 4:
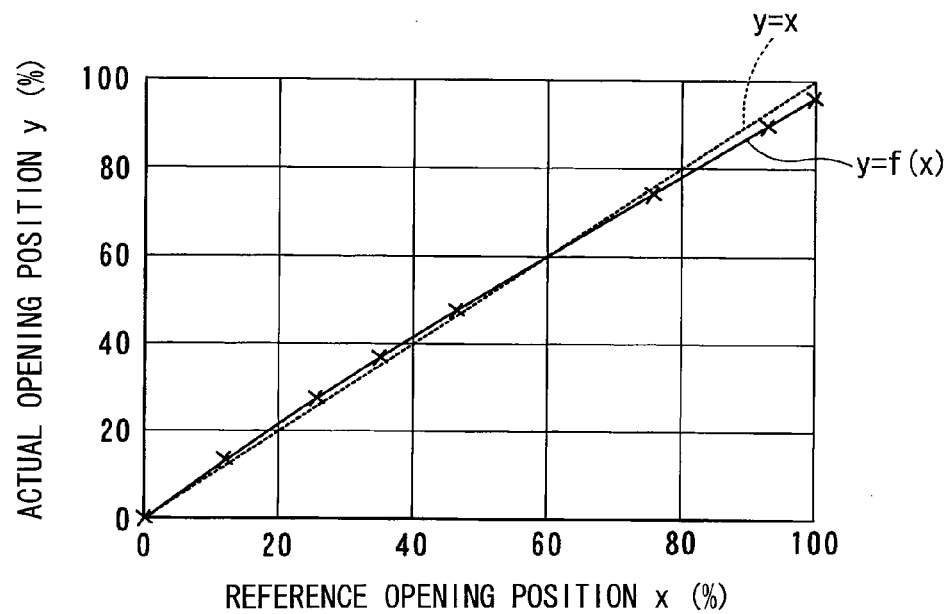
FIG. 4 is a graph showing a relation between a reference opening position x and an actual opening position y according to the embodiment.

More specifically, for example, a quantity of flow Q0 is produced at 80% in the reference opening position. However, the same quantity of flow Q0 is produced at a value less than 80% in the actual opening position. Therefore, an error occurs between the reference opening position x and the actual opening position y. The error differs at each quantity of flow. Therefore, the error is measured at each of multiple points of quantity of flow. Thus, as shown in FIG. 4, the relation between the reference opening position x and the actual opening position y is calculated as an error-characteristics function f(x). In the present embodiment, the actual opening position y is represented by, for example, a sixth-order function of the reference opening position x. The error between the reference flow characteristic and the actual flow characteristic differs among individual EGRVs 1. Therefore, the error-characteristics function f(x) is beforehand set for each individual EGRV 1.

The control unit includes a storage unit and a compensation unit. The storage unit stores the error-characteristics function f(x). The compensation unit compensates the control signal for producing a desired quantity of flow according to the error-characteristics function f(x). According to the present embodiment, the ECU 24 may function as the storage unit and the compensation unit.

The control unit is configured to send the control signal to the electric motor 14 to implement the opening position control to produce a desired quantity of flow, according to the reference flow characteristic stored in the storage unit, in an ideal state, in which the reference flow characteristic is identical to the actual flow characteristic. To the contrary, in a case where the error occurs, the compensation unit compensates the reference flow characteristic by utilizing the error-characteristics function f(x). Further, the control unit acquires a compensated reference flow characteristic, i.e., a flow characteristic resembled to the actual flow characteristic. Thus, the control unit implements the opening position control with reference to the present flow characteristic.

It is noted that, another configuration than compensating the reference flow characteristic may be employed. For example, the output signal from the opening position sensor 6 may be compensated with reference to the error-characteristics function f(x). In this case, the control signal may be generated with reference to the compensated opening position and the reference flow characteristic. More specifically, for example, when a quantity of flow Q0 is desirable, 80 is substituted in the error-characteristics function f(x), and the target opening position may be determined. Subsequently, the control signal sent to the actuator 5 may be determined, such that the detection value of the opening position sensor 6 coincides with the present target opening position.

Manufacturing Method of EGRV

As follows, a storing process to store the error-characteristics function f(x) in the storage unit will be described. The storing process is implemented in a manufacturing process of the EGRV 1 according to the present embodiment. The error-characteristics function f(x) corresponding to each individual EGRV 1 is encoded thereby to generate a characteristic code. The characteristic code may be stated on a surface of the EGRV 1. In the storing process, the error-characteristics function f(x) may be stored with reference to the characteristic code. For example, the characteristic code may be specified with a QR Code (registered trademark), a barcode, and/or the like, such that the characteristic code can be recognizable by viewing the surface of the housing 2 from the outside. In this case, the characteristic code may be read (scanned) with a reader device and stored in the ECU 24.

It is noted that, a serial number may be assigned to each individual EGRV 1. In this case, the error-characteristics function f(x) corresponding to the serial number may be downloaded in the ECU 24 of a corresponding EGRV 1.

Operation Effect

According to the present embodiment, the error between the reference flow characteristic and the actual flow characteristic is stored as the error-characteristics function f(x) in each individual EGRV 1. Further, the opening position control is implemented by utilizing the present error-characteristics function f(x). The present configuration enables implementation of the opening position control for each individual EGRV 1 with reference to the flow characteristic, which is resembled to the actual flow characteristic. Therefore, a desired quantity of flow can be produced with high accuracy even by implementation of an open-control. In addition, the error between the reference flow characteristic and the actual flow characteristic is stored as continuous error-characteristics function f(x), not a few data points, and used for compensation. The present configuration enables the flow control with higher accuracy. It is noted that, in the present embodiment, the error-characteristics function f(x) is calculated for each individual EGRV 1. Alternatively, the error-characteristics function f(x) may be determined for each manufacture lot.

As described above, the valve device according to the present disclosure includes the valve element, the actuator, the sensor, and the control unit. The valve element is configured to open and close the passage thereby to variably manipulate a quantity of flow of fluid flowing through the passage. The actuator manipulates the valve element. The sensor detects the opening position of the valve element. The control unit generates the control signal for controlling the actuator with reference to the output signal, which is sent from the sensor, and the predetermined correlation between the opening position and the quantity of flow. The control unit sends the generated control signal. The reference flow characteristic is the correlation between the opening position and the quantity of flow, which is predetermined. The actual flow characteristic is the correlation between the opening position and the quantity of flow, which is actually measured separately from the reference flow characteristic. The error-characteristic function is acquired by approximating the relation between the opening position x in the reference flow characteristic and the opening position y in the actual flow characteristic at the same quantity of flow, which are calculated beforehand with reference to the actual flow characteristic and the reference flow characteristic. The control unit includes the storage unit configured to store the error-characteristic function. The control unit further includes the compensation unit configured to compensate the control signal according to the error-characteristic function.

The present configuration enables to store, as the function, the error between the reference flow characteristic and the actual flow characteristic. The present configuration further enables to control the opening position to produce a desired quantity of flow by utilizing the present function. The present configuration stores the error as the function and utilizes the error for the compensation, thereby to enable the compensation with higher accuracy than a configuration in which compensation is made at a few measurement points.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A manufacturing method for a valve device, the valve device comprising:
   a valve element configured to open and close a passage to variably control a quantity of flow of fluid through the passage;
   an actuator configured to manipulate the valve element;
   a sensor configured to detect an opening position of the valve element; and
   a control unit configured to generate a control signal for controlling the actuator according to both an output of the sensor and a predetermined correlation between the opening position and the quantity of flow, the control unit further configured to send the control signal, wherein
   the control unit includes:
   a storage unit configured to store an error-characteristic function; and
   a compensation unit configured to compensate the control signal according to the error-characteristic function,
   the predetermined correlation between the opening position and the quantity of flow is a reference flow characteristic,
   an actual correlation between the opening position and the quantity of flow is an actual flow characteristic, the actual correlation being actually measured separately from the reference flow characteristic, and
   the error-characteristic function is an approximation of a relation between an opening position x in the reference flow characteristic and an opening position y in the actual flow characteristic at a same quantity of flow, calculated beforehand with reference to the actual flow characteristic and the reference flow characteristic,
   the manufacturing method comprising:
   encoding the error-characteristic function into a characteristic code, the characteristic code being indicated on a surface of the valve device;

storing the error-characteristic function in the storage unit with reference to the characteristic code;

assigning a serial number to each individual valve device; and downloading the error-characteristics function corresponding to the serial number in the control unit.

2. The manufacturing method according to claim 1, further comprising:

reading the characteristic code with a reader device; and storing the characteristic code in the storage unit.

3. The manufacturing method according to claim 1, further comprising:

determining the error-characteristics function for each manufacture lot of the valve device.

4. The manufacturing method according to claim 1, further comprising:

substituting a value, which corresponds to a quantity of flow, in the error-characteristics function to determine a target opening position; and determining the control signal, such that the output of the sensor coincides with the target opening position.

* * * * *